United States Patent [19]

Garner

[11] 3,865,915

[45] Feb. 11, 1975

[54] INJECTION MOULDING OF COMPLEX SHAPED LAMINAR ARTICLES

[75] Inventor: Paul Johnson Garner, Welwyn Garden City, England

[73] Assignee: Imperial Chemical Industries Limited, London, England

[22] Filed: Jan. 15, 1973

[21] Appl. No.: 324,004

Related U.S. Application Data

[63] Continuation of Ser. No. 71,332, Sept. 11, 1970, abandoned.

[30] Foreign Application Priority Data

Sept. 15, 1969 Great Britain.................... 45295/69

[52] U.S. Cl....................... 264/55, 264/45, 264/54, 264/139, 264/321, 264/328, 264/DIG. 14
[51] Int. Cl........................... B29d 27/00, B29f 1/00
[58] Field of Search............. 264/45, 46, 48, 54, 55, 264/139, 321, 328

[56] References Cited

UNITED STATES PATENTS

| 3,751,534 | 8/1973 | Oxley | 264/45 |
| 3,767,742 | 10/1973 | Robin | 264/45 |

Primary Examiner—H. S. Cockeram
Attorney, Agent, or Firm—Cushman, Darby & Cushman

[57] ABSTRACT

Providing areas in a mould, which is used for making laminar articles by the sequential injection therein of two or more thermoplastic materials, beyond the required shape of a moulding to accept excess polymer from the first shot as it is urged to the extremities of the mould by the injection of the second shot.

8 Claims, No Drawings

INJECTION MOULDING OF COMPLEX SHAPED LAMINAR ARTICLES

This is a continuation of application Ser. No. 71,332 filed Sept. 11, 1970, now abandoned.

The present invention relates to moulds suitable for the injection moulding of complex shaped articles which are formed from laminated synthetic resinous materials having a core derived from one material integrally moulded to surface skins derived from another synthetic resinous composition. Such articles are hereinafter referred to as "laminar articles." In particular the invention relates to moulds for the production of laminar articles which have a foamed core surrounded by unfoamed surface skins.

The present invention is concerned with improved techniques for the production of laminar articles which are produced by injecting a first charge of a synthetic resinous material into a mould and subsequently and before the centre of the first charge has set injecting a second charge of synthetic resinous material into the centre of the first charge. In this way a laminar article having a core derived from the second charge of material and surrounded by a surface skin derived from the first charge of material is obtained.

In the production of laminar mouldings by the techniques set out above, the first charge of material is generally of insufficient size to fill the mould. The first charge is then urged to the extremities of the mould by the injection of the second charge. The edge of the first charge of material will move radially outwards from the sprue through which the second material is injected into the mould. Thus, if a disc shaped moulding is being prepared an article having a core uniformly surrounded by the skin forming material will be obtained.

However, if complex or irregular shaped mouldings are to be produced, especially mouldings with sharp corners, the material of the first charge that is injected into the mould will tend to be forced into the sharp corners. Accordingly, the mould articles that are obtained will consist almost entirely of the skin forming material at the sharper corners of the moulding.

The present invention is directed towards providing techniques whereby complex or irregular shaped laminar mouldings in which the skin forming material is more evenly distributed around the core formed material may be obtained.

According to the present invention we provide a mould in which complex shaped laminar articles may be produced by sequentially injecting two or more synthetic resinous materials into a mould comprising a cavity defining the shape of the article to be moulded and extensions to said cavity at at least one corner or edge of the moulding into which material of the first charge that is injected into the mould can flow as the second charge is being injected.

By using a mould of the present invention the areas which are filled only by material of the first charge that is injected into the mould due to the shape of the moulding may be trimmed off, either whilst in the mould or subsequently, and discarded. It is therefore possible to obtain mouldings in which the skin forming material is more evenly distributed around the core forming material in the finished article than has hitherto been possible by an injection moulding process. These areas may simply be cut away from the moulding after it has been removed from the mould or they may be cut away from the moulding while it is still in the mould at any time during the moulding cycle. For example cutting knives may be mounted in the mould which can be moved to cut off the unwanted areas at the required time during the moulding cycle.

The present invention is particularly applicable to the production of moulded articles which have a foamed core surrounded by a skin of unfoamed material. These articles may be produced by first injecting a charge of unfoamable material into the mould, a charge of foamable material may then be injected so that it penetrates to within the charge of unfoamable material. The amounts of the two charges of material may be adjusted so that the mould is filled by foaming of the foamable material. Alternatively and as is preferred, the amounts of the two charges may be such that the mould cavity is filled before any foaming takes place and the size of the cavity then enlarged to allow the foamable material to foam. If articles having a foamed core are produced in a mould which has an enlargeable mould cavity the material which has flowed into the extensions to the mould cavity may be removed from the remainder of the mould cavity at any time after the cavity has been filled.

The extensions to the mould cavity at at least one of the sharp corners of the moulding may simply provide an area in the moulding which surrounds the corner and in effect 'rounds off' the corner of the moulding. Alternatively the mould cavity may be formed so that the corners or edges of the moulding are connected to small chambers or to outside the mould so that material may flow from the mould through the connecting channel into the small chambers or out of the mould. This technique has the particular advantage that the moulding is joined to the pieces made up of the excess of the first charge by only a thin strip of material and they may thus easily be removed.

The size of the extensions to the mould cavity will depend upon the nature of the polymer and shape and size of the moulding that is being produced. However, for economic reasons the amount of synthetic resinous material that must be thrown away as scrap or reused should be as small as possible. Accordingly, it is preferred that the extensions be as small as possible consistent with the production of satisfactory mouldings. In the preferred embodiment of the present invention where the extensions to the mould cavity consist of small chambers connected to the sharp corners or irregular edges of the moulding these chambers may conveniently be of adjustable volume so that the minimum required volume of the chamber may be discovered by trial and error.

The techniques of the present invention may be used to produce laminated articles having a core of any suitable synthetic resinous material surrounded by a skin formed of any other synthetic resin. Either or both of the synthetic resins may be thermosetting or thermoplastic although we prefer that both synthetic resinous materials are thermoplastic materials. The two materials may be the same or different. For example, if they are the same the techniques of the present invention may conveniently be used if it is necessary to impart some special surface effect to a moulded article and if the additive necessary to produce this effect is costly it need only be included in the outer layer.

The moulds of the present invention are particularly suited to the production of mouldings having a foamed core and unfoamed surface skins. In this instance the first charge that is injected into the mould should be unfoamable, and the second charge foamable.

The amount of unfoamable resin that is injected into the mould will depend upon the size of the mould and the required thickness of the unfoamed surface skin. Any synthetic resin, thermoplastic or thermosetting which may be injection moulded may be used as the unfoamable resin and examples of suitable thermoplastics include polymers of α-olefines such as polyethylene, polypropylene, polybutene and poly-4-methyl pentene-1, and copolymers of such olefines; polymers and copolymers of vinyl chloride optionally containing a plasticiser; polymers and copolymers of styrene; polymers and copolymers of methyl methacrylate, linear polyesters such as polyethylene terephthalate, polysulphones, polymers and copolymers of formaldehyde and polyamides such as the various nylons. If thermosetting resins are used the resin may be one that cross links on heating due to its own chemical nature or may be a normally thermoplastic resin which contains additives which cause cross-linking on heating. The choice of the resin will depend upon the use to which the article is to be put, for example, if a stiff panel is required to form, for example, part of the body of a motor car then a stiff outer skin is required and polypropylene is a suitable resin. However, if a flexible moulding is required, for example, for the interior trim of a motor car then a plasticised vinyl chloride polymer will be eminently suitable as the unfoamable thermoplastic resin.

The resin which contains the blowing agent may be the same as or different from the unfoamable resin and may conveniently be a resin selected from those resins described above as being suitable as the unfoamed resin.

One or more walls of the mould cavity may be lined with a removable insert prior to the injection of the synthetic resinous materials into the mould. The resinous material will then adhere to the insert when it is injected into the mould and thus this technique may be used to provide a rigid backing to the cellular article having the unfoamed skin. This is particularly useful in the production of flexible mouldings such as the interior trim of a motor vehicle where it is desirable to have a resilient trim with a pleasing surface which can be rigidly mounted in the motor vehicle; in this case one of the walls of the mould may be lined to provide the backing to mount the trim whereas the other is not lined thus providing the pleasing surface. Examples of suitable lining materials include wooden sheets such as plywood and hardboard, metal sheets or sheets of thermoplastic materials which do not melt at the moulding temperatures. The lining could if desired be of a flexible material.

In a further embodiment of a moulding cycle using a mould of the present invention a second amount of the first charge of synthetic resinous material may be injected into the mould after the second charge of material. An advantage of using this technique is that the second amount of the first charge removes any residual material of the second charge there may be in the injection nozzle and thus leaves the nozzle clean for the next moulding operation.

The surface of the moulds of the present invention may be textured to impart any desired surface finish to the moulded article. For example, the mould surface may be smooth, grained, matt or have a regular pattern thereon so as to impart a corresponding surface finish to the unfoamed skin of the article. Alternatively, the mould may be coated with a high temperature resistant material, for example, silicone rubber, to impart a desired surface finish.

I claim:

1. A process for the production of injection moulded articles having a skin of a synthetic resinous material surrounding a core of a dissimilar synthetic resinous material at all points away from the sprue area of the molding, comprising:
    a. injecting a charge of a skin-forming injection moldable synthetic resinous material into a mold cavity defining the shape of the article to be molded, said cavity having at least one extension positioned at an area of the mold which is substantially filled only by the skin-forming material,
    b. continuing the injection of the charge of skin-forming material to inject an amount which is insufficient to fill the mold cavity but which is in excess of that required for a substantially uniform thickness of skin on the article to be molded.
    c. subsequently, but before the interior portion of the charge of skin-forming material has solidified, injecting a charge of a core-forming injection moldable synthetic resinous material into the interior portion of the charge of skin-forming material,
    d. continuing the injection of the charge of the core-forming material into the charge of the skin-forming material to inject an amount which extends the skin-forming material as a skin surrounding the core-forming material at all points away from the sprue area of the mold cavity and to fill the mold cavity and to force the excess of the skin-forming material into said at least one extension so that only skin-forming material enters the at least one extension, and, thereafter,
    e. removing the skin-forming material forced into said at least one extension from the skin-forming material in the mold cavity before or after demolding the molded article.

2. The process of claim 1 in which the synthetic resinous materials injected into the mold cavity are thermoplastic resinous materials.

3. The process of claim 1 wherein the core-forming material is a foamable composition and the amounts of skin-forming material and unfoamed, foamable core-forming composition injected is insufficient to fill the mold cavity and the mold cavity is filled by the foaming of the foamable core-forming composition.

4. The process of claim 1 wherein the core-forming material is a foamable composition and the amounts of skin-forming material and unfoamed, foamable core-forming composition injected is sufficient to fill the mold cavity, thereby constraining the foamable core-forming composition from foaming, and wherein then the volume of the mold cavity is enlarged to allow the foamable core-forming composition to foam, thereby extending of the surrounding skin-forming material to conform to the enlarged mold cavity and forcing excess of skin-forming material into the at least one extension of the mold cavity.

5. The process of claim 1 wherein a further quantity of skin forming material is injected into the mold cavity after injection of the core-forming material.

6. The process of claim 4 wherein a further quantity of skin-forming material is injected into the mold cavity after injection of the core-forming material and before foaming of the core-forming material is allowed to occur.

7. In a method of injection molding a laminar article by injecting a skin-forming injection moldable synthetic resinous material into a mold cavity in a quantity insufficient to fill the mold cavity and before the said skin-forming material has set, injecting a core-foaming injection moldable synthetic resinous material into the said skin-forming material, whereby the mold cavity is filled with the said materials, the improvement comprising providing at least one extension for the said mold cavity, receiving only in said extension an excess portion of said skin-forming material during and/or subsequent to injecting said core-forming material and removing the skin-forming material received in said extension before or after demolding the molded article, whereby a molded article is obtained with the skin-forming material distributed around the core-forming material.

8. A process for the production of injection molded articles having a skin of a synthetic resinous material surrounding a core of a dissimilar synthetic resinous material at all points away from the sprue area of the molding comprising:

a. injecting a charge of a skin-forming injection moldable synthetic resinous material into a mold cavity defining the shape of the article to be molded, said cavity having at least one extension positioned at an area of the mold which is substantially filled only by the skin-forming material, b. continuing the injection of the charge of skin-forming material to inject an amount which is insufficient to fill the mold cavity but which is in excess of that required for a substantially uniform thickness of skin on the article to be molded, c. subsequently, but before the interior portion of the charge of skin-forming material has solidified, injecting a charge of a core-forming injection moldable foamable synthetic resinous material into the interior portion of the charge of skin-forming material, d. continuing the injection of the charge of the core-forming material into the charge of the skin-forming material to inject an amount which extends the skin-forming material as a skin surrounding the core-forming material at all points away from the spure area of the mold cavity of fill the mold cavity, to constrain the foamable composition from foaming and to force the excess of the skin-forming material into said at least one extension so that only skin-forming material enters the at least one extension, e. enlarging the volume of the mold cavity to allow the fomable composition to foam and extend the skin-forming material to conform a the enlarged mold cavity, and f. removing the skin-forming material forced into said at least one extension from the skin-forming material in the mold cavity before or after demolding the molded article.

* * * * *